UNITED STATES PATENT OFFICE.

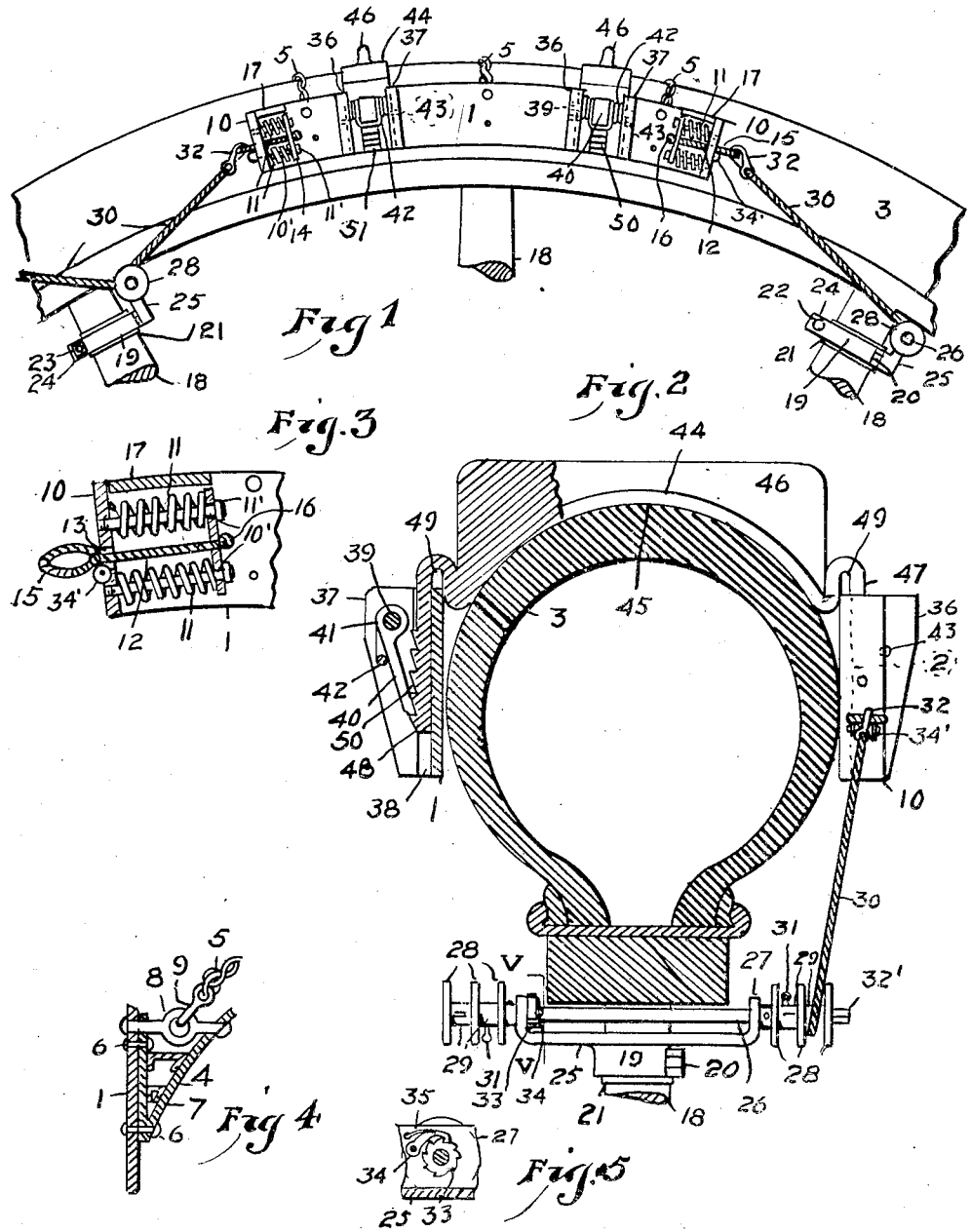

DAVID P. DAVIES, OF PITTSBURGH, PENNSYLVANIA.

TRACTION DEVICE FOR AUTOMOBILE-WHEELS.

1,354,537.  Specification of Letters Patent.  Patented Oct. 5, 1920.

Application filed April 16, 1920. Serial No. 374,423.

*To all whom it may concern:*

Be it known that I, DAVID P. DAVIES, a citizen of the United States, residing at Pittsburgh, in the county of Allegheny and State of Pennsylvania, have invented certain new and useful Improvements in Traction Devices for Automobile-Wheels, of which the following is a specification.

This invention relates to traction devices for automobile wheels, and the primary objects thereof are to provide a device of the character described, in a manner as hereinafter set forth, which enables rubber-tired wheels to firmly grip the ground even on muddy roads irrespective of their condition, which may be readily and conveniently attached in position to an automobile wheel, and which embodies a plurality of traction units any of which may be eliminated or others added without impairing the utility of the positioned units.

Further objects of the invention are to provide a traction device for automobile wheels comprising detachable traction units which are automatically tightened upon the vehicle wheel by the travel of the latter and which may be placed in position without requiring that the wheel be moved or jacked up regardless of its position.

Still further objects of the invention are to provide a device of the class described which is simple in its construction and arrangement, strong, durable and efficient in its use, which provides novel means for securing same in position, and which is comparatively inexpensive to manufacture.

To the accomplishment of these and such other objects as may hereinafter appear, the invention consists of the novel construction, combination and arrangement of parts herein specifically described and illustrated in the accompanying drawing wherein is shown an embodiment of the invention, but it is to be understood that the device shown is merely illustrative and that various changes in the form, proportion and minor details of construction may be resorted to, without departing from the principle or sacrificing any of the advantages of the invention, which come within the scope of the claims hereunto appended.

In the drawing forming a portion of this specification and wherein like numerals of reference designate corresponding parts throughout the several views:

Figure 1 is a side elevation of an automobile wheel, with portions thereof broken away, provided with traction devices in accordance with this invention.

Fig. 2 is a transverse sectional view of a pneumatic tire illustrating the traction device positioned thereon.

Fig. 3 is an enlarged detail view of the tensioning spring and associated parts.

Fig. 4 is a sectional view of the side plate and the retaining bracket.

Fig. 5 is a view on line V—V, Fig. 2.

Referring in detail to the drawing the invention comprises a pair of flat segmental side plates 1 and 2, respectively, each of which is curved longitudinally to conform to the circumferential curvature of the tire 3. The plates 1 and 2 are oppositely disposed in parallel alinement relative to each other against respective sides of the tire 3 and are maintained in alined position by the brackets 4 and the chains 5, which latter extend transversely over the tread of the tire 3 and connect the plates 1 and 2 together. Each of the brackets 4 is secured to the inner face of respective plates by rivets 6 and is provided with a flat inner face 7 curved to conform to the transverse curvature of the tire against which it is adapted to seat. The outer ends of the brackets 4 are provided with securing rings 8 to which the end of the chains 5 are detachably connected by means of snap hooks 9.

Each end edge of the plates 1 and 2 is formed with a rectangularly disposed flange 10 having a pair of parallel studs 10' permanently fixed thereto, which pass through and carry a suitably apertured compression plate 14 slidably mounted thereon and secured thereto by the nut 11' on each of the free ends of the studs 10'. A spiral compression spring 11 is mounted on each of the studs 10', one end of which abuts against the flange 10 and the other end thereof against the compression plate 14. A rectangularly disposed flange 17, commensurate in length to the length of the springs 11 when in the normal or extended position, is formed with the outer edge of each plate, at both ends thereof, and forms a guard for the springs 11, thereby protecting the latter against damage due to the hard service to which the traction device is necessarily subjected.

A flexible wire rope 12, provided at one end with a connecting link 15, passes through the aperture 13 in the flange 10, extends intermediate of the pair of springs 11, and has its other end connected, as at 16, to the compression plate 14.

Each pair of plates 1 and 2 with their associated parts, as herein described, constitute a unit of the traction device and any desired number of such units may be employed to best meet conditions found in practice.

An anchoring element is carried on such spokes 18 of the wheel, so as to position an anchoring element substantially intermediate of every two adjacent units of the traction device. Each anchoring element comprises a clamp 19, hinged, as at 20, and provided on its inner face with a non-abrasive lining 21, made from any suitable material, to prevent injury to the spoke to which it is attached and to conform more readily to the contour of the latter. The clamp 19 is fixedly secured to the spoke by a bolt 22 with an associated nut 23, the former engaging in suitably apertured lugs 24 of the clamp 19.

The clamp 19 carries a support 25 in which a horizontally extending shaft 26 is rotatably mounted, as at 27. Each end of the shaft 26 projects beyond the support 25 and is provided with three collars 28 forming two drums 29 upon which the wire ropes 30 are adapted to be wound. Each drum 29 is provided with a hook 31 for securing respective ends of the ropes 30 thereto. The other ends of the ropes 30 are each provided with a snap hook 32 and connect with respective connecting links 15 on the outer face of the flange 10 and connected with the rope 12. It will be noted that the adjacent ends of every two units are connected to a common anchoring element positioned therebetween. The length of the ropes 30 and the manner of winding the same upon the drums is such as to simultaneously draw taut associated ropes and tension the springs carried by adjacent ends of two units. The outer end of the shaft 26 is squared as at 32', for the reception of a suitable tool for rotating the said shaft and tensioning said ropes for securing the traction units firmly to the tread of the tire.

A ratchet wheel 33 is fixed to the shaft 26 and is adapted to be engaged by a pawl 34 pivotally carried by the support 25. The pawl 34 is held in engagement with the ratchet wheel 33 by a spring 35 also carried by the support 25. The action of this ratchet element is such as to permit the rotation of the shaft 26 in one direction only when in the engaged position for winding the ropes 30 on respective drums 29. For releasing the shaft 26 the pawl 34 is manually released from the ratchet wheel 33.

The ropes 30 are disposed to extend at an angle with respect to the radius of the wheel to prevent circumferential movement of the traction unit upon the periphery of the tire.

To prevent friction of the ropes 12 in apertures 13 when springs 11 are tensioned, a sheave 34' therefor is carried on the outer face of each of the flanges 10. The action of the springs 11 in conjunction with the ropes 30 is such that the latter will at all times be tensioned and will serve to counteract and absorb any shock concomitant to the operation of the traction device.

While illustrating and describing what is thought to be the best method of attaching the traction units to the tire of the wheel, it will be obvious that the same may be attached in any suitable manner to best meet conditions found in practice, it only being essential that each pair of plates 1 and 2 be firmly, though tensionally, held in parallel alinement with respect to each other on respective opposed sides of the tire.

The outer face of each of the plates 1 and 2 is provided with two pairs of supporting brackets, each pair comprising the two brackets 36 and 37, which extend parallel with respect to each other. Parallel grooves 38 are formed on the facing walls of each pair of brackets. Each pair of brackets is in spaced relation with respect to each other, and each pair of brackets on the plate 1 is in parallel alinement with a pair of brackets on the plate 2.

A shaft 39 is rotatably supported by each pair of brackets, adjacent the outer ends thereof, upon which a pawl 40 is fixedly and centrally mounted, as at 41, intermediate of the brackets 36 and 37. A spring 42, mounted on the shaft 39 and secured to the brackets 36 and 37, as at 43, and engaging the pawl 40, normally forces the latter toward the plate for the purpose hereinafter described.

The traction member adapted for use in connection with the traction device hereinbefore described, comprises a base member 44, which is curved, as at 45, to conform to the transverse curvature of the tread of the tire upon which the base member 44 is adapted to seat. Formed integral with the base 44 and projecting outwardly therefrom is a longitudinally extending traction flange 46, which latter is disposed centrally of the base 44 and provided with a straight outer edge.

The traction member is further provided, at each end thereof, with a depending securing leg 47 and 48, respectively, which are virtually a continuation of the base 44. Each of the upper portions of the legs 47 and 48 is so bent and attached to the integrally formed base and traction flange, as to provide a recess 49 therebetween. The outer face of each of the securing legs 47 and 48 is provided with a ratchet rack 50 extending centrally from adjacent the upper end to the free lower end thereof.

The traction member is adapted to be mounted on the plates 1 and 2, by inserting the securing legs 47 and 48 thereof into an opposed pair of brackets on respective plates 1 and 2, causing the edges of the legs 47 and 48 to engage in the grooves 38 formed in each of said pairs of brackets. When the traction member is positioned upon the plates 1 and 2, as above stated, the action of the spring 42 will cause the free end of the pawl 40 to automatically engage the teeth of the ratchet rack 50. Upon travel of the wheel, due to the resiliency of the tire, the traction members will automatically tighten themselves as they are pressed inwardly on the plates 1 and 2 and will be held in the secured position until the pawl 40 is manually released from the ratchet rack 50. The depth of the recess 49 is approximately in horizontal alinement with the tread of the tire and is provided to permit the passage of the upper edge of the plates therein when the traction members are pressed inwardly by the weight and travel of the vehicle.

On very soft and muddy roads the traction members may be readily and conveniently mounted on the plates, and perfect traction effected. Any desired number of traction members may be employed with each unit of the traction device.

What I claim is:

1. A device for the purpose set forth comprising a pair of opposed plates adapted to be mounted at the sides of a tire, means for connecting the plates together, means for connecting the plates with a wheel, and a traction member adapted to be mounted on the tire and overlapping said plates, said plates and member having associated means for automatically securing them together.

2. A device for the purpose set forth comprising a pair of plates adapted to be mounted on opposed sides of a tire, means for connecting the plates together, flexible members having a resilient connection with the ends of said plates and adapted to be coupled with a wheel for connecting the plates thereto, and traction members adapted to be mounted on the tire and having pawl and ratchet rack connection with said plates.

In testimony whereof I affix my signature.

DAVID P. DAVIES.